US008093742B2

United States Patent
Gupta et al.

(10) Patent No.: US 8,093,742 B2
(45) Date of Patent: Jan. 10, 2012

(54) METHOD FOR OPERATING A POWER DISSIPATING UNIT IN A WIND TURBINE

(75) Inventors: Amit Kumar Gupta, Singapore (SG); Sridhar Sahukari, Singapore (SG)

(73) Assignee: Vestas Wind Systems A/S, Randers SV (DK)

( * ) Notice: Subject to any disclaimer, the term of this patent is extended or adjusted under 35 U.S.C. 154(b) by 0 days.

(21) Appl. No.: 12/976,292

(22) Filed: Dec. 22, 2010

(65) Prior Publication Data

US 2011/0163544 A1 Jul. 7, 2011

Related U.S. Application Data

(60) Provisional application No. 61/292,995, filed on Jan. 7, 2010.

(30) Foreign Application Priority Data

Jan. 4, 2010 (DK) .................... PA 2010 70004

(51) Int. Cl.
*F03D 9/00* (2006.01)
*H02P 9/00* (2006.01)
(52) U.S. Cl. ........................................................ 290/44
(58) Field of Classification Search .................. 290/44
See application file for complete search history.

(56) References Cited

U.S. PATENT DOCUMENTS

| 6,933,625 | B2 * | 8/2005 | Feddersen et al. | 290/44 |
|---|---|---|---|---|
| 7,291,937 | B2 * | 11/2007 | Willisch et al. | 290/44 |
| 7,411,309 | B2 | 8/2008 | Hudson | |
| 2004/0222642 | A1 * | 11/2004 | Siebenthaler et al. | 290/44 |
| 2007/0164567 | A1 | 7/2007 | Luetze et al. | |
| 2008/0150285 | A1 * | 6/2008 | Corcelles Pereira et al. | 290/44 |
| 2009/0079193 | A1 * | 3/2009 | Nielsen et al. | 290/44 |
| 2009/0189393 | A1 * | 7/2009 | Tyagi et al. | 290/44 |

(Continued)

FOREIGN PATENT DOCUMENTS

EP 2107236 A1 10/2009

(Continued)

OTHER PUBLICATIONS

European Patent Office, International Search Report issued in related International Application No. PCT/DK2004/000921 dated Aug. 29, 2005.

(Continued)

*Primary Examiner* — Joseph Waks
(74) *Attorney, Agent, or Firm* — Wood, Herron & Evans, LLP (57) ABSTRACT

A variable speed wind turbine is provided. The wind turbine includes a generator, a power converter for converting at least a portion of electrical power generated by the generator, a power dissipating unit operatively coupled to the DC link, and a controller. The power converter includes a generator side converter, a grid side converter, and a DC (direct current) link therebetween. The controller is adapted to determine a DC link voltage error signal, the DC link voltage error signal being the difference between a function of an actual DC link voltage and a function of a predefined reference DC link voltage, determine a DC link error power based on the DC link voltage error signal, determine a feed forward power, and generate a duty ratio for operating the power dissipating unit based on the DC link error power and the feed forward power.

15 Claims, 7 Drawing Sheets

U.S. PATENT DOCUMENTS

2009/0224542 A1 9/2009 Nim
2010/0308584 A1* 12/2010 Coates et al. .................. 290/44
2011/0042965 A1* 2/2011 Atallah et al. ................ 290/1 C
2011/0089693 A1* 4/2011 Nasiri ............................ 290/44

FOREIGN PATENT DOCUMENTS

WO 2006069569 A1 7/2006

OTHER PUBLICATIONS

Danish Patent and Trademark Office, Office Action issued in related Application No. PA 2010 70004 dated Aug. 12, 2010.

Electus Distribution Reference Data Sheet, Copyright 2001, Electus Distribution.

* cited by examiner

METHOD FOR OPERATING A POWER DISSIPATING UNIT IN A WIND TURBINE

CROSS-REFERENCE TO RELATED APPLICATIONS

This application claims priority to Danish Patent Application No. PA 2010 70004 filed on Jan. 4, 2010 and claims the benefit of U.S. Provisional Application No. 61/292,995 filed on Jan. 7, 2010, the content of each is incorporated by reference herein in its entirety for all purposes.

FIELD OF THE INVENTION

The present invention relates generally to a wind turbine, and in particular, to a method for operating a power dissipating unit in a wind turbine.

BACKGROUND OF THE INVENTION

A wind turbine is an energy conversion system which converts kinetic wind energy into electrical energy for utility power grids. Specifically, wind is applied to wind turbine blades of the wind turbine to rotate a rotor. The mechanical energy of the rotating rotor in turn is converted into electrical energy by an electrical generator. Because wind speed fluctuates, the force applied to the wind blades and hence the rotational speed of the rotor can vary. Power grids however require a constant frequency electrical power to be provided by the wind turbine.

One type of wind turbine that provides constant frequency electrical power is a fixed-speed wind turbine. This type of wind turbine requires a generator rotor that rotates at a constant speed. A disadvantage of such fixed-speed wind turbine is that it does not harness all of the wind's energy at high speeds and must be disabled at low wind speeds. Another type of wind turbine is a variable speed wind turbine. This type of wind turbine allows the generator to rotate at variable speeds to accommodate for fluctuating wind speeds. By varying the rotating speed of the generator rotor, energy conversion can be optimized over a broader range of wind speeds.

A variable speed wind turbine usually includes a power converter having a generator side converter coupled to a grid side converter via a direct current (DC) link. The generator side converter regulates the power of the generator. This power passes through the DC-link, and is eventually fed to the grid through the grid side converter. The same is true for the Doubly Fed Induction Generator (DFIG) systems where only a portion of the power from the generator passes through the power converter.

Under normal conditions, the electrical power or energy from the generator is supplied to the grid through the power converter. In other words, the energy captured from the wind by the wind turbine is passed to the grid. Therefore, it can be said that there is power balance during normal conditions. However, when there is a sudden wind gust and/or grid fault, this power balance may be disrupted, resulting in more power being generated than power being supplied to the grid. Such power imbalance might lead to undesired tower oscillations, drive train damage or turbine tripping.

Specifically, the power output of the generator in response to a sudden wind gust can be approximated as ramp input to the power system in the wind turbine with a steep slope. Such load ramping is one of the most difficult load behaviors for a control system in the wind turbine. A wind turbine normally handles wind gust by pitching the blades to reduce the speed of rotor as disclosed, for example, in US 2009/0224542 and EP 2107236. However, due to the dynamics of a pitch controller, the pitching of the blade may not be fast enough to respond to the sudden wind gust. Hence this results in the sudden increase in the power generated by the generator, leading to the undesired tower oscillations, etc as mentioned above.

When there is a grid fault, for example a low voltage event, there is a sudden drop in demand for active power from the grid. Since the pitching of the blades is not able to respond fast enough to reduce power generation, there is an imbalance of power in the wind turbine. U.S. Pat. No. 7,411,309 discloses the use of a crowbar circuit during low voltage events at the grid. The crowbar circuit is coupled to the DC link between the generator side converter and the grid side converter. When the DC link voltage exceeds a predetermined value (due to grid fault), the crowbar circuit is activated to drain the excess generator power, hence lowering the DC link voltage.

The use of a crowbar circuit or a dump load circuit may provide a good way of dissipating excess power during a power imbalance event. The dump load circuit is activated by detecting an abnormal increase in the DC link voltage or a sudden drop in grid voltage. However, it may not be the most effective method to handle power imbalance events such as wind gust, or in extreme conditions when wind gust and grid fault happen at the same time. Moreover in this method, the resistor bank in the dump load circuit is excessively stressed.

It is thus an object of the invention to provide an improved way of managing excess power generated in the wind turbine in power imbalance event.

SUMMARY OF THE INVENTION

According to a first aspect of the invention, a variable speed wind turbine is provided. The wind turbine comprises a generator, a power converter for converting at least a portion of electrical power generated by the generator, a power dissipating unit operatively coupled to a DC (direct current) link of the power converter and a controller. The controller is adapted to determine a DC link voltage error signal, the DC link voltage error signal being the difference between a function of an actual DC link voltage and a function of a predefined reference DC link voltage, determine a DC link error power based on the DC link voltage error signal, determine a feed forward power and generate a duty ratio for operating the power dissipating unit based on the DC link error power and the feed forward power.

The power converter includes a generator-side converter for converting at least a portion of AC power from the generator into DC power, a grid-side converter for converting the DC power into AC power having fixed frequency and a DC link between the generator-side converter and the grid-side converter.

The generator is an electromechanical machine capable of converting mechanical energy into electrical energy. The generator used in the wind turbine could be any type of generator including but not limited to, a permanent magnet generator, doubly-fed induction generator and squirrel cage induction generator. The electrical power from the generator has a variable frequency due to the variable rotational speed of the rotor. A portion or all of the electrical energy or power generated by the generator is converted by the power converter into a fixed frequency electrical power suitable to be supplied to a power grid or a load.

The load may be a DC or an AC (alternating current) load. For supply of power to the grid, the power converter converts the electrical power with variable frequency into electrical power having a fixed frequency required by the grid. When supplying power to a load, for example a DC load, the power converter converts the electrical power with variable frequency into a DC power.

The power dissipating unit is coupled to the DC link of the power converter. The power dissipating unit is adapted to dissipate any excess power generated by the generator which can not be given to the grid. The power dissipating unit may be a resistor bank and may also be known as a chopper resistor.

The controller is adapted to determine the DC link voltage error signal. The DC link voltage error signal is the difference between a function of the actual DC link voltage and a function of the predefined reference DC link voltage. The function of the actual DC link voltage and the function of the predefined reference DC link voltage refer to any mathematical expression of the DC link voltage. Examples of the function include:

$f(X)=aX+b$; where $a$ and $b$ are constants, and $f(X)=X^2$, or any form of a polynomial expression, where X is the actual DC link voltage. The DC link voltage error signal can be expressed as $f_1(X)-f_2(Y)$, where Y is the predefined reference DC link voltage. The functions $f_1$ and $f_2$ may denote the same or different functions. The DC link error power is derived from the DC link voltage error signal. Based on the DC link error power and the feed forward power, the duty ratio for operating the power dissipating unit is determined.

The duty ratio refers to the percentage of time period the power dissipating unit is activated or turned on in one cycle. The duty ratio has a value from 0 to 1. When the duty ratio is 0, the power dissipating unit is turned off completely, and when the duty ratio is 1, the power dissipating unit is turned on for the whole duty cycle. When the duty ratio is 0.7, the power dissipating unit is turned on for 70% of the duty cycle (it is off for 30% of the remaining duty cycle). The advantage of using a duty ratio to control the operation of the power dissipating unit is that only the amount of excess power in the wind turbine is dissipated. An effect of dissipating only the amount of excess power using such a duty ratio control according to the embodiment is that maximum power is still supplied to the grid. This is in contrast to the prior art where the power dissipating unit is turned on and off based only on DC link voltage when the DC link voltage rises above a predetermined level. As the method according to the prior art does not know how much power to dissipate (as controlled by the duty ratio) and is only concerned with maintaining the DC link voltage within the predetermined level, it tends to dissipate most of the power in the power dissipating unit. This results in very low or no power being supplied to the grid and other turbine utilities. The dissipation of most of the power in the power dissipating unit also stresses the resistor banks in the power dissipating unit.

Additionally, the inclusion of the feed forward power in determining the duty ratio results in a fast response in activating the power dissipating unit when there is power imbalance in the wind turbine.

According to an embodiment, the power dissipating unit comprises at least a switch and one resistor. The power dissipating unit is turned on by closing the switch. The switch may be a power semiconductor device such as an Integrated Gate Bipolar Transistor (IGBT) which can be turned on or off by a suitable voltage through a gate driver. In alternative embodiments, the power dissipating unit may include at least a switch and at least one of a resistor, an inductor or a capacitor.

According to an embodiment, the DC link voltage error signal is the difference between the squares of the actual DC link voltage and the predefined reference DC link voltage. Specifically, the DC link voltage error signal can be expressed as $X^2-Y^2$, where X is the actual DC link voltage and Y is the predefined reference DC link voltage. As described earlier, the DC link error signal can be the difference between other functions of the actual DC link voltage and the predefined reference DC link voltage in other embodiments, such as $X-Y$, $(X^2+1)-(Y^2+1)$, etc.

According to an embodiment, the controller further comprises a PI (Proportional Integral) controller for determining the DC link error power based on the DC link voltage error signal. The advantage of using a PI controller for determining the DC link error power is its simplicity of implementation. In other embodiments, a P (Proportional) controller or a PID (Proportional Integral Derivative) controller may be used to determine the DC link error power.

According to an embodiment, the controller is further adapted to determine the feed forward power based on the difference between the power supplied to the generator side converter and the power transferred by the grid side converter. Under normal conditions, the power supplied to the generator side converter from the generator and the power transferred by the grid side converter is approximately the same. Therefore, the feed forward power is approximately zero, assuming zero power losses. However when there is wind gust and/or grid faults, the power supplied to the generator side converter exceeds the power transferred by the grid side converter. Hence, the feed forward power becomes non-zero. This non-zero feed forward power in the event of power imbalance in the wind turbine leads to faster activation of the power dissipating unit. It is also possible to determine the feed forward power based on other factors such as power captured from the wind in an alternative embodiment.

According to an embodiment, the controller is adapted to estimate the power supplied to the generator side converter based on the difference between the power extracted from the wind and power losses in the generator and in a drive train of the wind turbine. This has the advantage that the power supplied to the generator side converter from the generator can be obtained well in advance. In other embodiments, the power supplied to the generator side converter is obtained from the phase voltages and currents at the terminals between the generator and the generator side converter.

According to an embodiment, the controller is adapted to generate the duty ratio by determining power to be dissipated by the power dissipating unit, determining a maximum power that can be dissipated by the power dissipating unit, and determining the ratio of the power to be dissipated and the maximum power, thereby obtaining the duty ratio. The power to be dissipated by the power dissipating unit includes the DC link error power and the feed forward power. If the power to be dissipated exceeds the maximum amount of power that can be dissipated by the power dissipating unit, the duty ratio will be 1. In a further embodiment, the power dissipating unit is designed such that the maximum amount of power that can be dissipated by the power dissipating unit is always larger than the power that needs to be dissipated.

According to an embodiment, the controller is adapted to determine power extracted from the wind, power supplied by the wind turbine and power loss in the power dissipating unit, determine the difference between the power extracted from the wind and the sum of the power supplied by the wind turbine and power loss in the power dissipating unit, and activate the power dissipating unit when the difference in the power exceeds a predefined power difference threshold.

The power supplied by the wind turbine to the grid may also take into account power losses by various components in the turbine. When the difference between the power extracted from the wind and the sum of the power supplied by the wind turbine and power loss in the power dissipating unit exceeds the predefined power difference threshold, the power dissipating unit is turned on completely for the full time period. In other words, the duty ratio is set to 1. This has the advantage that it leads to an even faster response of the power dissipating unit under extreme conditions such as severe wind gust/turbulence and/or extreme grid faults, thus avoiding drive train damage, tower oscillations and turbine tripping. It should be noted that the power loss in the power dissipating unit is only non-zero when the power dissipating unit has been activated or turned on. In other words, when the power dissipating unit is turned off, the power loss in the power dissipating unit is zero.

According to a second aspect of the invention, a variable speed wind turbine is provided. The wind turbine comprises a generator, a power converter for converting at least a portion of electrical power generated by the generator wherein the power converter comprises a generator side converter, a grid side converter and a DC link therebetween, a power dissipating unit operatively coupled to the DC link and a controller. The controller is adapted to determine power extracted from the wind, power supplied by the wind turbine and power loss in the power dissipating unit, determine the difference between the power extracted from the wind and the sum of the power supplied by the wind turbine and power loss in the power dissipating unit, and activate the power dissipating unit when the power difference exceeds a predefined power difference threshold.

According to an embodiment, the controller is further adapted to set a duty ratio for operating the power dissipating unit to a non-zero value when the predefined power difference threshold is exceeded, thereby activating the power dissipating unit.

According to a third aspect of the invention, a method for operating a power dissipating unit in a wind turbine is provided. The wind turbine comprises a power converter for converting at least a portion of electrical power generated by a generator. The power converter comprises a generator side converter, a grid side converter and a DC link therebetween. The power dissipating unit is operatively coupled to the DC link. The method comprises obtaining a DC link voltage error signal, the DC link voltage error signal being the difference between a function of an actual DC link voltage and a function of a predefined reference DC link voltage, determining a DC link error power and a feed forward power, the DC link error power is determined based on the DC link voltage error signal, and generating a duty ratio for operating the power dissipating unit based on the DC link error power and the feed forward power.

It should be noted that a person skilled in the art would readily recognize that any feature described in combination with the first aspect of the invention could also be combined with the third aspect of the invention, and vice versa.

According to a fourth aspect of the invention, a method for operating a power dissipating unit in a wind turbine is provided. The wind turbine comprises a power converter for converting at least a portion of electrical power generated by a generator. The power converter comprises a generator side converter, a grid side converter and a DC link therebetween. The power dissipating unit is operatively coupled to the DC link. The method comprises determining power extracted from the wind, power supplied by the wind turbine and power loss in the power dissipating unit, determining the difference between the power extracted from the wind and the sum of the power supplied by the wind turbine and power loss in the power dissipating unit, and activating the power dissipating unit when the difference between the power exceeds a predefined difference threshold.

It should be noted that a person skilled in the art would readily recognize that any feature described in combination with the second aspect of the invention could also be combined with the fourth aspect of the invention, and vice versa.

BRIEF DESCRIPTION OF THE DRAWINGS

The invention will be better understood with reference to the detailed description when considered in conjunction with the non-limiting examples and the accompanying drawings.

DETAILED DESCRIPTION OF THE INVENTION

Figure 1:
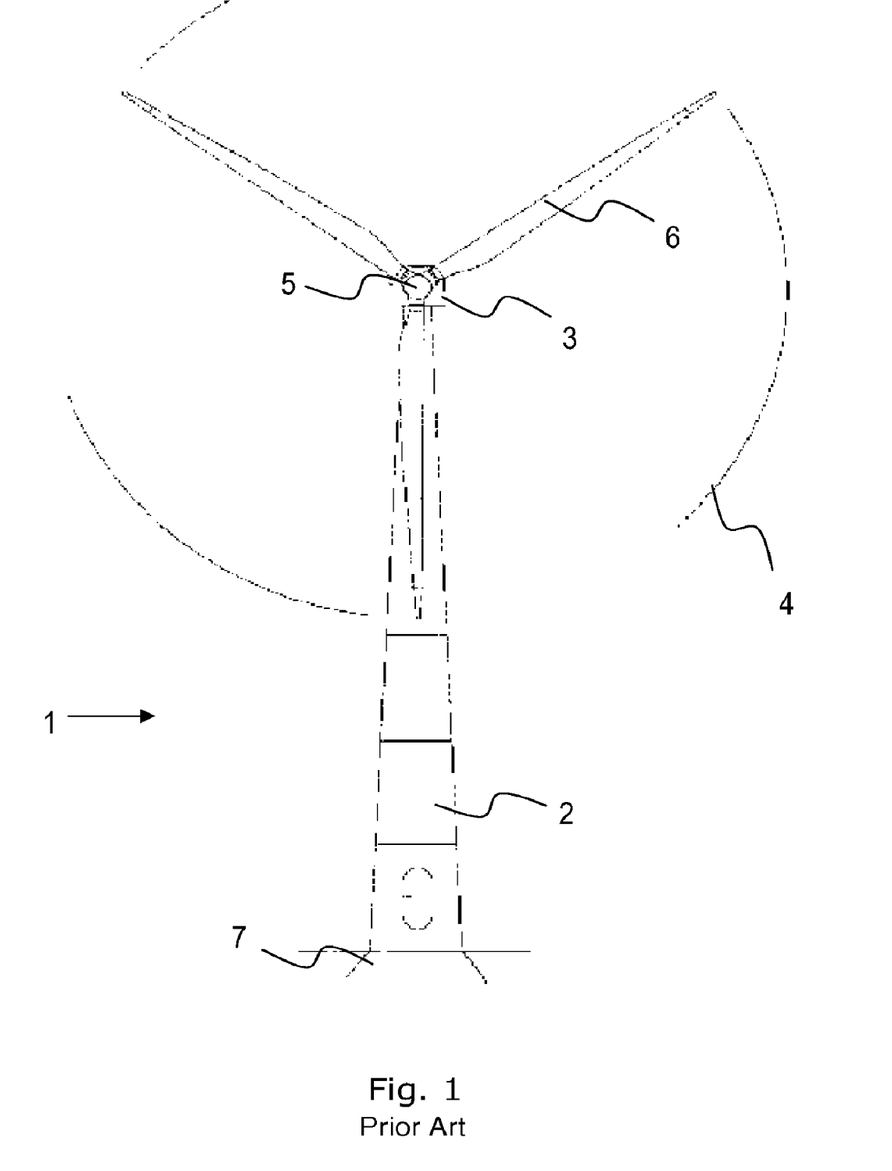
FIG. 1 shows a general structure of a wind turbine.

FIG. 1 shows a general setup of a wind turbine 1. The wind turbine 1 includes a tower 2 having a number of tower sections, a nacelle 3 positioned on top of the tower 2, and a rotor 4 extending from the nacelle 3. The tower 2 is erected on a foundation 7 built in the ground. The rotor 4 is rotatable with respect to the nacelle 3, and includes a hub 5 and one or more blades 6. Wind incident on the blades 6 causes the rotor 4 to rotate with respect to the nacelle 3. The mechanical energy from the rotation of the rotor 4 is converted into electrical energy by a generator (not shown) in the nacelle 3. The electrical energy is subsequently converted into a fixed frequency electrical power by a power converter to be supplied to a power grid. The wind turbine may also form part of a wind farm or a wind power plant comprising a plurality of wind turbines. All the electrical power generated by the individual wind turbines in the wind farm are consolidated and supplied to the power grid via a Point of Common Coupling (PCC).

Although the wind turbine 1 shown in FIG. 1 has three blades 6, it should be noted that a wind turbine may have different number of blades. It is common to find wind turbines having two to four blades. The wind turbine 1 shown in FIG. 1 is a Horizontal Axis Wind Turbine (HAWT) as the rotor 4 rotates about a horizontal axis. It should be noted that the rotor 4 may rotate about a vertical axis. Such a wind turbine having its rotor rotates about the vertical axis is known as a Vertical Axis Wind Turbine (VAWT). The embodiments described henceforth are not limited to HAWT having 3 blades. They may be implemented in both HAWT and VAWT, and having any number of blades 6 in the rotor 4.

Figure 2:
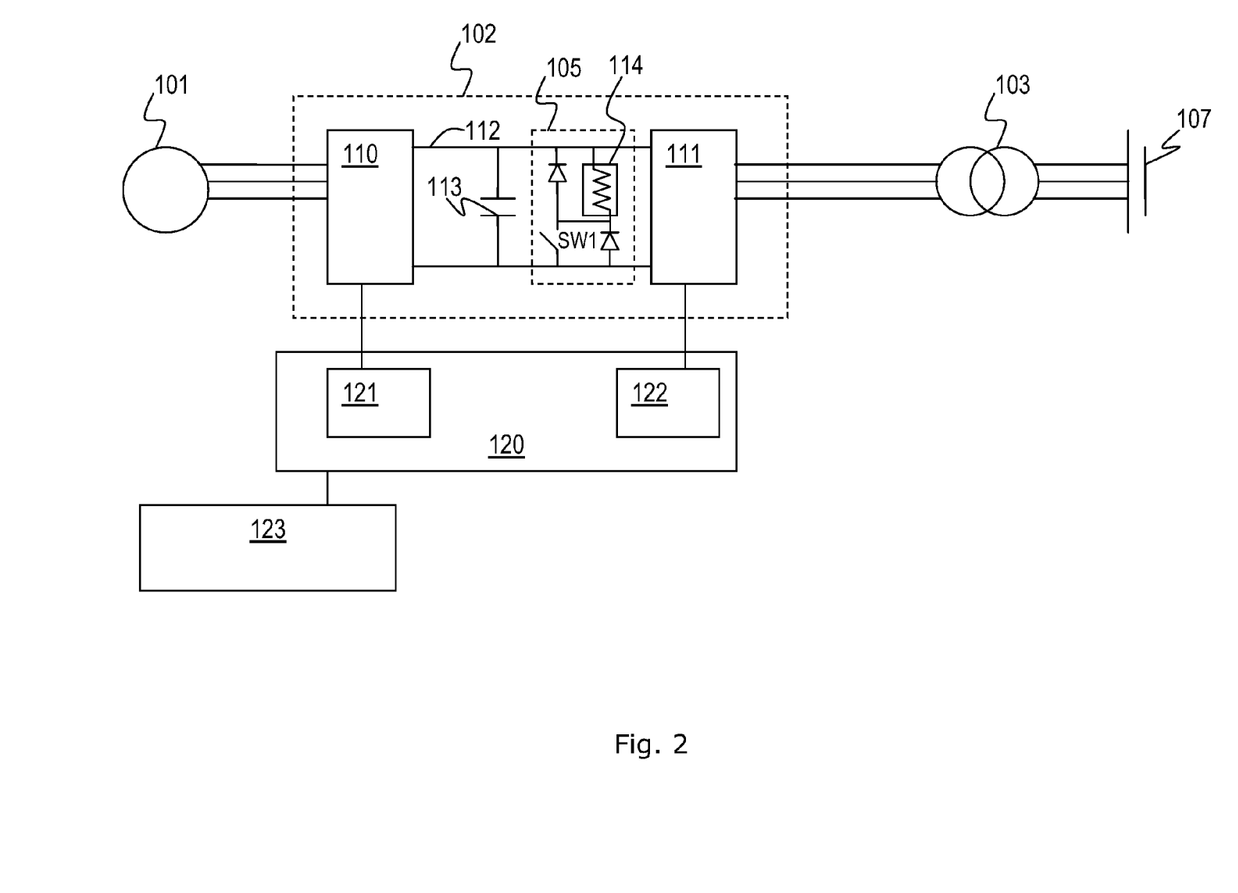
FIG. 2 shows an electrical system layout of the wind turbine with a chopper or power dissipating unit circuit.

FIG. 2 shows an electrical system of the wind turbine having a power dissipating unit or a chopper circuit 105 according to an embodiment. The electrical system includes a generator 101, a power converter 102 and a main transformer 103. The electrical system is connected to a power grid 107. The power converter 102 includes a generator-side converter 110 and a grid-side converter 111 connected via a direct current (DC) link 112. The DC link 112 includes a DC link capacitor 113. The chopper circuit 105 is connected to the DC link 112, and includes a switch SW1 and a resistor 114.

The generator 101 converts mechanical energy or power to electrical energy or power having AC (alternating current) voltage and current (collectively referred to as "AC signals"), and provides the generated AC signals to the generator-side converter 110. The AC signals from the generator have a variable frequency, due to varying wind. The generator-side converter 110 converts or rectifies the AC signals to a DC (direct current) voltage and a DC current (collectively know as "DC signals") which are placed on the DC link 112. The grid-side converter 111 converts the DC signals on the DC link 112 into fixed frequency AC signals for the power grid 107. The power comprising the fixed frequency AC signals at the output of the grid-side converter 111 is stepped up by the main transformer 103 into a level suitable to be received and transmitted by the power grid 107.

The operation of the generator-side converter 110 is controlled by a generator controller 121, and the operation of the grid-side converter 111 is controlled by a grid controller 122. The generator controller 121 and the grid controller 122 form part of a converter controller 120. A wind turbine controller 123 provides an overall control of the operation of the wind turbine. For example, the wind turbine controller 123 may receive information (e.g. wind speed) from external sensors (e.g. anemometer) and provides control signal to a pitch control (not shown) for pitching the blades in order to obtain a desired rotor speed. The wind turbine controller 123 may also provide control signals to the converter controller 120 for controlling the converters 110 and 111.

During normal operation of the wind turbine, the electrical power generated by the generator is converted by the power converter 102 into power having fixed frequency AC signals to be supplied to the power grid 107. The switch SW1 is open, and hence no power is dissipated in the resistor 114. In other words, assuming no losses, almost all the power generated by the generator is supplied to the power grid 107, and there is "power balance" in the wind turbine. When there is a voltage dip in the power grid 107 (low voltage event) resulting in decreased active power transferred by the grid-side converter to be supplied to the grid and/or when there is a sudden wind gust causing a sudden increase in the rotational speed of the blades of the wind turbine (wind gust event), the power generated by the generator exceeds the power supplied to the power grid 107. In other words, there is "power imbalance" in the wind turbine. As mentioned earlier, such power imbalance in the wind turbine leads to undesired effects such as tower oscillations, drive train damage or turbine tripping.

When there is power imbalance in the wind turbine, any excess power that is not supplied to the grid 107 is dissipated by the resistor 114 in the chopper circuit 105 by closing the switch SW1. According to an embodiment, the operation (opening and closing) of the switch SW1 is controlled so that the resistor 114 in the chopper circuit 105 only dissipates the excess power in the wind turbine. In other words, the chopper circuit 105 is only activated when there is power imbalance in the wind turbine, and only for a period just enough to dissipate the excess power. The control of the operation of the switch SW1, and hence the operation of the chopper circuit 105, shall be described later with reference to FIG. 3.

It should be noted that the electrical system described with reference to FIG. 2 is only an example of the electrical configuration of the wind turbine and only the main components are shown to illustrate the embodiments. The present invention should not be limited to the exact electrical system configuration shown in FIG. 2. Other electrical configurations are possible. For example, a Doubly Fed Induction Generator (DFIG) configuration may be used in other embodiments. Also, many components in the electrical system of the wind turbine are not shown in FIG. 2. For example, the electrical system may include filters between the generator 101 and the power converter 102, and between the power converter 102 and the main transformer 103. Also, there may be switches arranged at various locations for connecting or disconnecting certain components of the turbine. The resistor 114 in the chopper circuit 105 may include a single resistor or a bank of resistors.

The electrical system shown in FIG. 2 need not be connected to the power grid 107. It can be connected to an AC or a DC load. If it is connected to a DC load, the grid-side converter 111 and the transformer 103 may be omitted, and the DC link 112 can be connected directly to the DC load. Alternatively, a DC-to-DC converter may be arranged between the DC link 112 and the DC load to step up or step down the DC voltage at the DC link 112 to a suitable DC voltage for the DC load.

Figure 3:
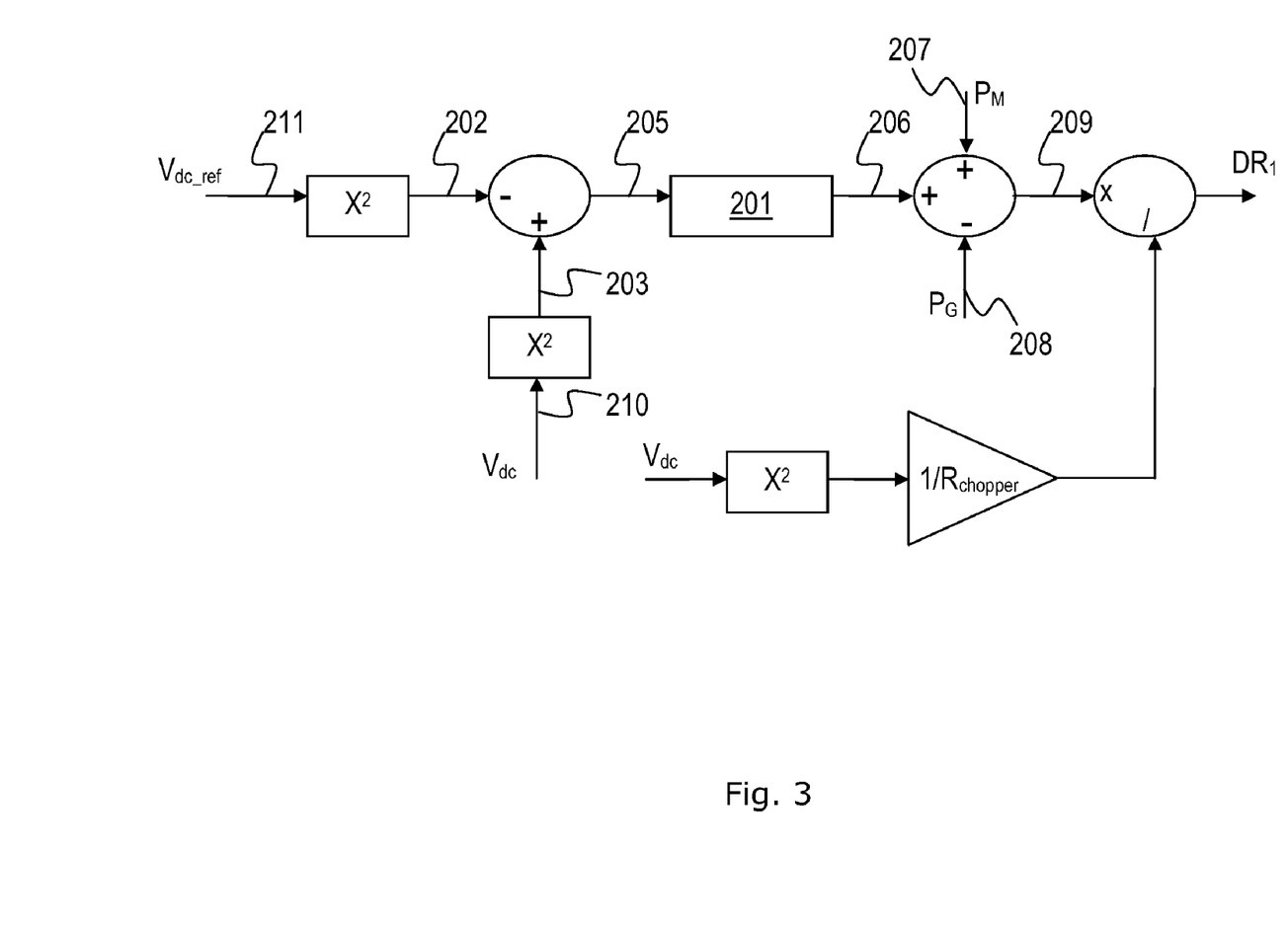
FIG. 3 shows a control algorithm for operating the chopper circuit when there is power imbalance in the wind turbine according to an embodiment.

FIG. 3 shows a control algorithm for operating the chopper circuit when there is power imbalance in the wind turbine according to an embodiment. The voltage at the DC link 210 is used as one of the factors to decide whether the chopper circuit should be activated. This is because any electrical power from the generator if not transferred to the grid or load leads to an increase in the DC-link voltage. Therefore in this control algorithm, there is no need to detect any power imbalance separately as the chopper circuit is activated automatically in the event of power imbalance as will be evident from the description below.

In the control algorithm of FIG. 3, a function of the predefined reference DC link voltage 202 and a function of an actual DC link voltage 203 are obtained. As mentioned earlier, the function $f(X)$ of the actual DC link voltage (and also the function of the predefined reference DC link voltage) may be any mathematical expression of the DC link voltage, such as $f(X)=X$, $f(X)=aX+b$, or $f(X)=X^2$, or any polynomial relationship, where a and b are constants and X is the actual DC link voltage. In this embodiment, the function of the actual DC link voltage is $X^2$. The function of the predefined reference DC link voltage also uses the same function in this embodiment.

The difference between the squares of the actual DC link voltage 203 and the predefined reference DC link voltage 202 is obtained as a DC link error voltage 205. A PI (Proportional Integral) controller 201 receives the DC link error voltage 205 as input and outputs a DC link error power 206. According to an embodiment, the control algorithm further includes determining a feed forward power. The feed forward power is the difference between the power supplied to the generator side converter 207 and the power transferred by the grid side converter 208.

Under normal conditions when there is power balance in the wind turbine, the feed forward power is approximately zero, assuming no power loss. However when there is wind gust and/or grid fault leading to power imbalance, the feed forward power becomes non-zero. The addition of the feed forward power to the DC link error power 206 leads to a fast activation of the chopper circuit.

The power supplied to the generator side converter 207 can be expressed as:

$$P_M = V_{am}I_{am} + V_{bm}I_{bm} + V_{cm}I_{cm}, \qquad (1)$$

where $P_M$ is the power supplied to the generator side converter from the generator, $V_{am}$, $V_{bm}$ and $V_{cm}$ are the phase voltages at the generator terminals, and $I_{am}$, $I_{bm}$ and $I_{cm}$ are the currents through the generator terminals. The currents $I_{am}$, $I_{bm}$, $I_{cm}$ can be measured between the power converter and the generator. The voltages $V_{am}$, $V_{bm}$, $V_{cm}$ can be measured at the generator terminals directly. If it is not possible to measure the voltages $V_{am}$, $V_{bm}$, $V_{cm}$ at the generator terminals, reference voltages at the converter terminals may be used. Using the reference voltages at the converter terminals and measured currents at the generator terminals, the power from the generator in $\alpha\beta$ co-ordinate system can be given as:

$$P_{M\alpha\beta} = 1.5(v_\alpha i_\alpha + v_\beta i_\beta) \qquad (2)$$

where $P_{M\alpha\beta}$ is $P_M$ in the $\alpha\beta$ co-ordinate system, $v_\alpha$, $v_\beta$ and $i_\alpha$, $i_\beta$ are voltages and currents in the $\alpha$ and $\beta$ co-ordinates, respectively.

In an alternative embodiment, the power supplied to the generator side converter from the generator $P_M$ is estimated using the following expression:

$$P_M = P_{Wind} - P_{L,Drivetrain} - P_{L,Generator} \qquad (3)$$

where $P_{wind}$ is power extracted from the wind, $P_{L,Drivetrain}$ are the losses in the drive train and $P_{L,Generator}$ are the losses in the generator. For a given speed and torque, $P_{L,Drivetrain}$ and $P_{L,Generator}$ can be obtained using a lookup table for a given gearbox and generator. The advantage of estimating $P_M$ using equation (3) is that the $P_M$ can be obtained faster as compared to using equation (1).

The power transferred by the grid side converter 208 can be expressed as:

$$P_G = V_{ag}I_{ag} + V_{bg}I_{bg} + V_{cg}I_{cg} \qquad (4)$$

where $P_G$ is the power transferred by grid side converter, $V_{ag}$, $V_{bg}$ and $V_{cg}$ are the voltages at the converter terminals, and $I_{ag}$, $I_{bg}$ and $I_{cg}$ are the currents through the converter terminals. If the voltages at the converter terminals $V_{ag}$, $V_{bg}$, $I_{cg}$ cannot be obtained, for example due to converter switching, reference voltages for the converter may be used instead. Using the reference voltages for the converter and measured currents at the converter terminals, the power transferred by the grid side converter in $\alpha\beta$ co-ordinate system can be given as:

$$P_{G\alpha\beta} = 1.5(v_\alpha i_\alpha + v_\beta i_\beta) \qquad (6)$$

where $P_{G\alpha\beta}$ is $P_G$ in the $\alpha\beta$ co-ordinate system, $v_\alpha$, $v_\beta$ and $i_\alpha$, $i_\beta$ are voltages and currents in the $\alpha$ and $\beta$ co-ordinates, respectively.

The total power $P_{total}$ to be dissipated 209 is the sum of the DC link error power 206 and the feed forward power $(P_M - P_G)$. The maximum power that can be dissipated by the chopper circuit can be determined as follows:

$$P_{max} = \frac{V_{dc}^2}{R_{chopper}} \qquad (7)$$

where $P_{max}$ is the maximum power that can be dissipated by the resistor or resistor bank in the chopper circuit, $V_{dc}$ is the actual DC link voltage, and $R_{chopper}$ is the resistance of the resistor in the chopper circuit. The resistance value $R_{chopper}$ of the resistor is normally selected such that the $P_{max}$ is larger than an anticipated maximum power that may need to be dissipated in a wind gust and/or grid fault event. In an embodiment, the value of $R_{chopper}$ is chosen such that $P_{max}$ is about 10-20% larger than the nominal power rating of the turbine.

The duty ratio for operating the chopper circuit is determined as the ratio between the total power to be dissipated $P_{total}$ and the maximum power $P_{max}$, that is:

$$DR_1 = \frac{P_{total}}{P_{max}} \qquad (8)$$

where $DR_1$ is the duty ratio. Since the total power $P_{total}$ is always less than the maximum power $P_{max}$, the duty ratio has a value from 0 to 1.

Under normal conditions when there is no power imbalance in the wind turbine, the voltage at the DC link is regulated by a DC link controller to a preset DC link voltage. The preset DC link voltage is the voltage level which is maintained at the DC link under normal conditions. The reference DC link voltage $V_{dc\_ref}$ is predefined or set to a value which is higher than this preset DC link voltage. Therefore under normal conditions, the DC link error power 206 is negative as the DC link voltage (which is regulated to the preset DC link voltage) has a value lower than the reference DC link voltage. The feed forward power $(P_M - P_G)$ will be approximately zero, and hence $P_{total}$, is negative. Accordingly, the duty ratio is zero. The switch SW1 is not turned on, and chopper circuit is not activated.

When there is power imbalance, both the DC link error power 206 and feed forward power $(P_M - P_G)$ become non-zero. This results in the total power to become non-zero. Therefore, the duty ratio will now have a non-zero value from 0 to 1. When the duty ratio has a value of 0.5, the chopper circuit is only activated or turned on for 50% of the time in one duty cycle. Similarly when the duty ratio has a value of 0.3, the chopper circuit is only activated for 30% of the time in one duty cycle.

Accordingly, the chopper circuit is not activated all the time when there is power imbalance to dissipate power, but only for an appropriate period of time depending on the extent of the power imbalance in the wind turbine as controlled by the duty ratio. Therefore, the efficiency and effectiveness of the chopper circuit is ensured as only power that is not supplied to the grid is dissipated. The use of feed forward power also ensures fast activation of the chopper circuit in the event of power imbalance in the wind turbine. Thus oscillation of the wind turbine tower due to sudden wind gust and/or grid fault can be avoided as the chopper circuit can now be activated quickly.

The control algorithm of FIG. 3 has been described with reference to the full scale converter based turbine shown in FIG. 2. It should be noted that the control algorithm described with reference to FIG. 3 is also applicable in a DFIG system. In the full scale converter based turbine shown in FIG. 2, the power transferred by the grid side converter 111 is approximately the same as the power supplied to the grid 107 if any power losses between the output of the grid side converter 111 and the grid 107 is assumed to be negligible. Similarly, the power supplied to the generator side converter 110 is approximately the same as the power generated from the generator 101, assuming negligible power losses between the output of the generator 101 and the generator side converter 110.

In a DFIG system, the power supplied to the grid is the sum of the power transferred by the grid side converter 111 and the power transferred through the stator windings. The power generated from the generator 101 is the sum of the power supplied to the generator side converter 110 and the power transferred through the stator windings.

Figure 4:
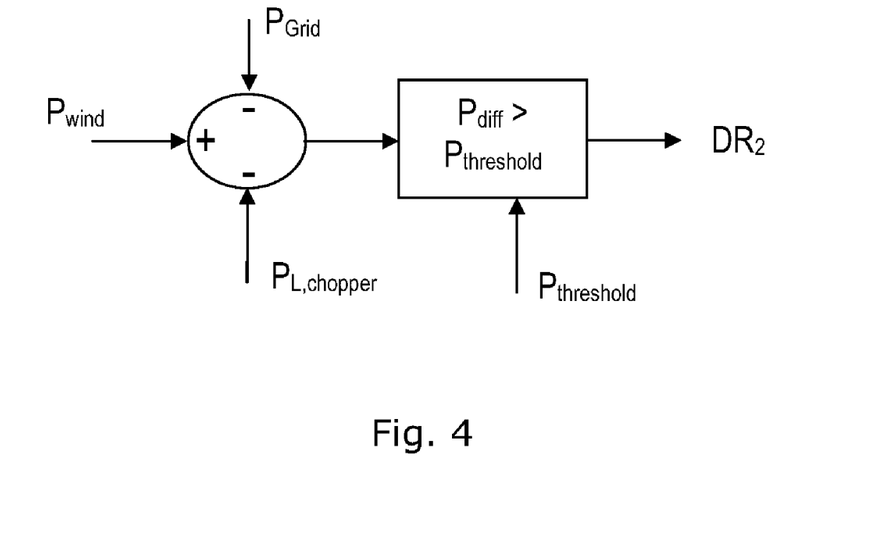
FIG. 4 shows a control algorithm for operating the chopper circuit when there is extreme power imbalance in the wind turbine according to an embodiment.

FIG. 4 shows a control algorithm for operating the chopper circuit when there is extreme and sudden power imbalance in the wind turbine according to an embodiment. The power extracted from the wind $P_{wind}$, the power supplied to the grid or load $P_{Grid}$ and the power loss in the chopper circuit $P_{L,chopper}$ are obtained. The power difference $P_{diff}$ between the power extracted from the wind $P_{wind}$, and the power supplied to the grid $P_{Grid}$ and the power loss in chopper circuit $P_{L,chopper}$ is determined. Specifically, the power difference is determined using the following expression:

$$P_{diff} = P_{wind} - P_{Grid} - P_{L,chopper} \qquad (9)$$

The power difference $P_{diff}$ is compared to a predefined power difference threshold $P_{threshold}$. If the power difference $P_{diff}$ exceeds the predefined difference threshold $P_{threshold}$, the chopper circuit is turned on, i.e. the duty ratio $DR_2$ for operating the chopper circuit is set to 1. Otherwise, $DR_2$ is set to 0. The threshold $P_{threshold}$ is set to a value such that it is only exceeded when the difference $P_{diff}$ is large, for example during extreme wind gust and/or extreme fault conditions. $P_{threshold}$ can be stored in a lookup table for various wind gust and/or extreme fault conditions.

The power from the wind can be determined using the following expression:

$$P_{wind} = \frac{1}{2} \rho A V_{wind}^3 C_p(\theta, \lambda) \qquad (10)$$

where $\rho$ is the air density, A is the rotor area, $V_{wind}$ is the wind speed, $C_p$ is rotor power coefficient, $\theta$ is the pitch angle and $\lambda$ is the tip speed ratio. Assuming constant rotor area A and air density $\rho$, the power from the wind $P_{wind}$ is proportional to $V_{wind}^3 C_p(\theta, \lambda)$. The direct use of wind velocity $V_{wind}$ provides a very fast method of determining whether there is a wind gust event.

As mentioned earlier, in the full scale converter based wind turbine system, the power supplied to the grid $P_{Grid}$ is approximately the same as the power transferred by the grid side converter 111. Therefore, the power supplied to the grid can be determined using equation (4) as discussed above. In the DFIG system, the power supplied to the grid $P_{Grid}$ is the sum of the power transferred by the grid side converter 111 and the power transferred through the stator windings as the stator is directly coupled to the grid.

Figure 5:
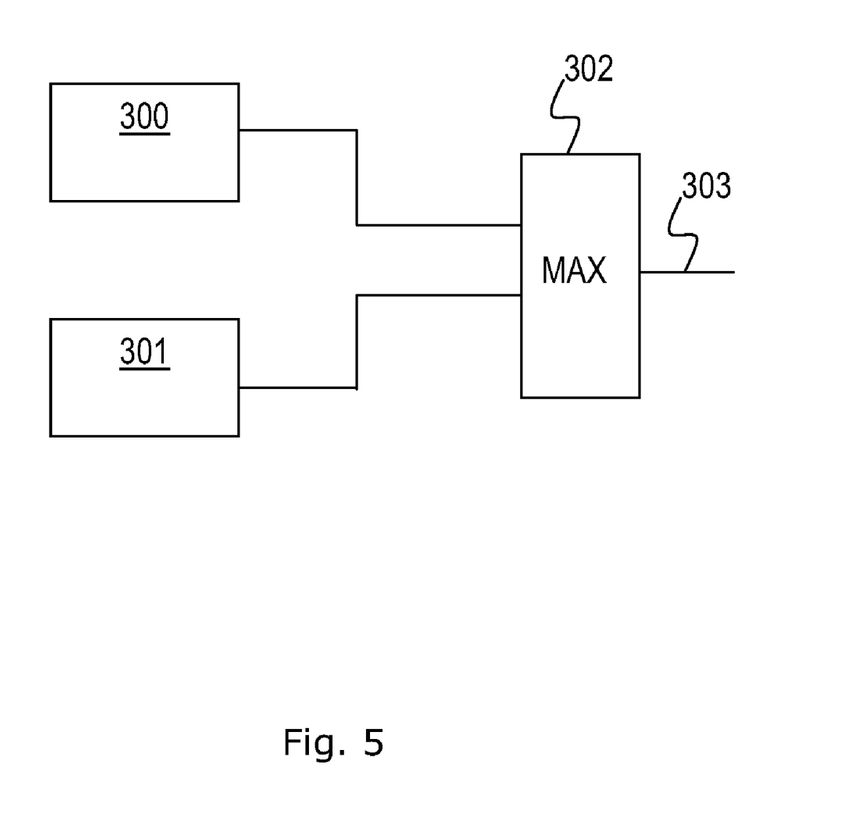
FIG. 5 shows an overall control algorithm for operating the chopper circuit. according to an embodiment.

The power loss in the chopper circuit $P_{L,chopper}$ is:

$$P_{L,chopper} = V_{dc}^2 / R_{chopper} \times DR \qquad (11)$$

where $V_{dc}$ is the DC link voltage and DR is the duty ratio of the chopper. It should be noted that DR may be the same as the duty ratio $DR_2$ in the embodiment where only the control algorithm in FIG. 4 is used or is obtained by taking a maximum (MAX) of $DR_1$ and $DR_2$ in an embodiment where both the control algorithms in FIG. 3 and FIG. 4 are used (see FIG. 5). When the chopper circuit is not activated, the power loss in the chopper circuit $P_{L,chopper}$ is zero since the DR is zero.

When there is no wind gust or grid fault, the power supplied to the grid $P_{Grid}$ is approximately the same as the power extracted from the wind $P_{wind}$, assuming negligible losses in the drive train. The power loss in the chopper circuit $P_{L,chopper}$ is zero if the chopper circuit is not activated. At any given time, it can be assumed that the sum of the power supplied to the grid $P_{Grid}$ and the power loss in the chopper circuit $P_{L,chopper}$ is the total power consumption in the wind turbine (assuming no other losses in the wind turbine drive train). When there is extreme wind gust and/or grid fault, the power difference $P_{diff}$ between the $P_{wind}$ and the total power consumed $P_{Grid}$ and $P_{L,chopper}$ can become significantly large. This may lead to over speeding of the generator, tower vibration and/or turbine tripping. The power difference $P_{diff}$ is compared to the difference threshold $P_{threshold}$. This difference threshold $P_{threshold}$ can be tabulated in a lookup table, and is the limit at which problems such as tower vibration and turbine tripping starts to occur. When the difference threshold $P_{diff}$ exceeds the difference threshold $P_{threshold}$, the chopper circuit is activated to reduce the power difference $P_{diff}$.

Accordingly, the use of the control algorithm in FIG. 4 to control the operation of the chopper circuit provides a fast and effective way of activating the chopper circuit in the event of extreme and sudden wind gust and/or grid fault conditions.

In an embodiment, the control algorithm in FIG. 4 is used in conjunction with the control algorithm shown in FIG. 3 for operating the chopper circuit in event of power imbalance in the wind turbine. When there is wind gust and/or grid fault, the operation of the chopper circuit is controlled by the duty ratio obtained using the control algorithm of FIG. 3. Under extreme and sudden wind gust or fault conditions, the control algorithm of FIG. 4 is used to activate the chopper circuit. Such arrangement where both the control algorithms are used is shown in FIG. 5.

In FIG. 5, the control algorithm described with reference to FIG. 3 is represented as block 300 and the control algorithm described with reference to FIG. 4 is represented as block 301. The outputs of both block 300 and block 301 are provided as inputs to a MAX function block 302. The output of the MAX function block 302 is provided as the control signal for controlling the operation of the chopper circuit. Specifically, the output 303 of the MAX function block 302 is the duty ratio from the control algorithm of FIG. 3 when there is power imbalance in the wind turbine. Under extreme power imbalance, the duty ratio at the output 303 of the MAX function block 302 gives a value of 1 due to the output of block 301 being 1. In other words, as long as one of the control algorithms gives a non-zero duty ratio, the chopper circuit is activated.

It should be noted that the configuration in FIG. 5 is merely an illustrative example on how the control algorithms shown in FIG. 3 and FIG. 4 can be used in conjunction with each other. Other types of configurations, for example taking an OR of the outputs of blocks 300 and 301, are possible in other embodiments. The control algorithms described above with reference to FIG. 3 and FIG. 4 may be implemented in the converter controller 120 and/or the wind turbine controller 123 of FIG. 2. It is also possible to implement the control algorithms using an independent and/or separate controller (not shown in FIG. 2). It should also be noted that it is possible to use only one of the control algorithms described with reference to FIG. 3 or FIG. 4 to control the chopper circuit in other embodiments.

Figure 6:
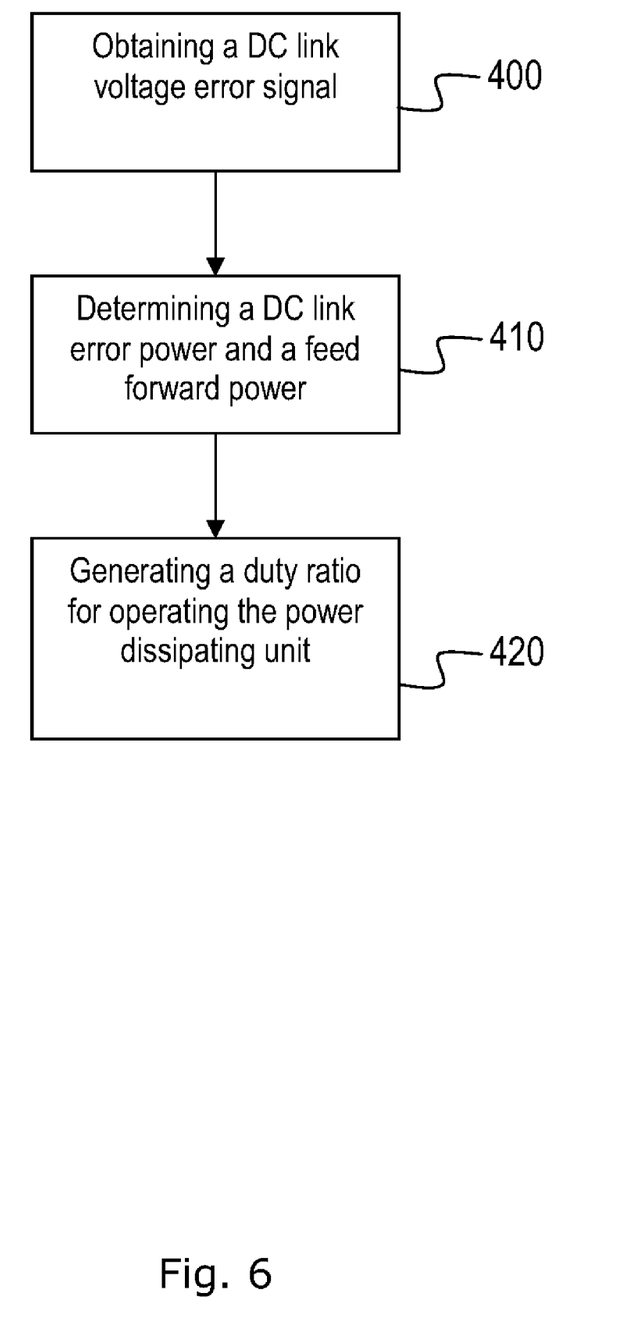
FIG. 6 shows a flow-chart of a method for operating the chopper circuit in the wind turbine according to an embodiment.

FIG. 6 shows a flow-chart of a method for operating the power dissipating unit in the wind turbine according to an embodiment. Step 400 includes obtaining a DC link voltage error signal. The DC link voltage error signal is the difference between a function of the actual DC link voltage and a function of the predefined reference DC link voltage. As mentioned earlier, the function of the actual and predefined reference DC link voltage may include any mathematical expression relating to the DC link voltage. In an embodiment, the function is the squares of the actual DC link voltage and the predefined reference DC link voltage.

Step 410 includes determining the DC link error power and the feed forward power. The DC link error power is determined based on the DC link voltage error signal. As mentioned earlier, the DC link error power may be determined using the PI controller with the DC link voltage error signal as an input. In an embodiment, the feed forward power includes the difference between the power supplied to the generator side converter and the power transferred by the grid side converter. Step 420 includes generating the duty ratio for operating the power dissipating unit. In an embodiment, the duty ratio is used to operate the power dissipating unit. The chopper circuit as described with reference to FIG. 2 earlier is an example of the power dissipating unit. The duty ratio is generated based on the DC link error power and the feed forward power. In an embodiment, the duty ratio is the ratio between the power to be dissipated by the power dissipating unit and the maximum power the power dissipating unit can dissipate. The power to be dissipated is the sum of the DC link error power and the feed forward power in an embodiment. Steps 400 to 420 are then repeated, so that the duty ratio is constantly being updated.

Figure 7:
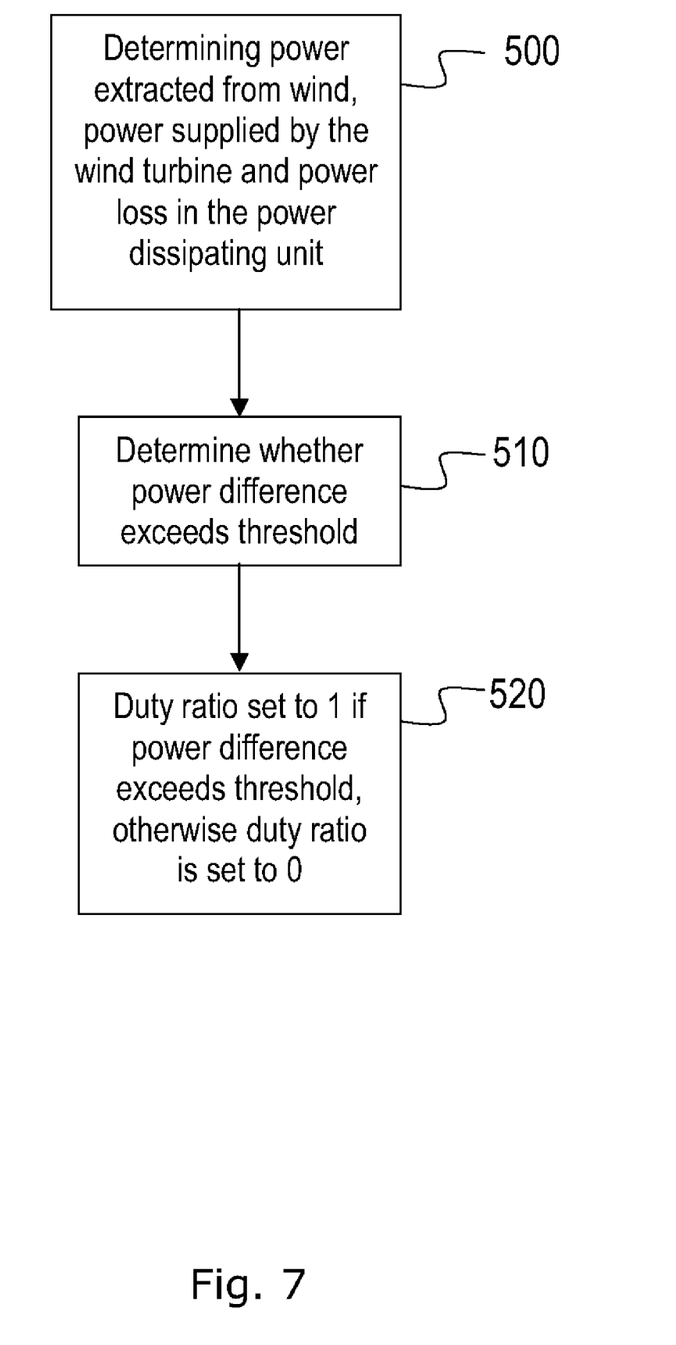
FIG. 7 shows a flow-chart of a method for operating the chopper circuit in the wind turbine when there is extreme power imbalance in the wind turbine according to an embodiment.

FIG. 7 shows a flow-chart of a method for operating the chopper circuit in the wind turbine when there is extreme power imbalance in the wind turbine according to an embodiment. Step 500 includes determining the power extracted from the wind, the power supplied by the wind turbine and the power loss in the power dissipating unit. The power dissipating unit may be a chopper circuit in an embodiment. As described earlier, the power from the wind can be determined using equation (10) in an embodiment. The power loss in the power dissipating unit may be determined using equation (11). The power loss in the power dissipating unit is zero if the chopper circuit is not activated.

Step 510 includes determining whether the power difference between the power extracted from the wind, and the sum of the power supplied to the grid and the power loss from chopper circuit exceeds the power difference threshold. If the power difference exceeds the power difference threshold, the duty ratio is set to 1 at step 520. Otherwise, the duty ratio is set to 0 (also at step 520). Steps 500 to 520 are then repeated, so that the duty ratio is constantly being updated.

Figure 8:
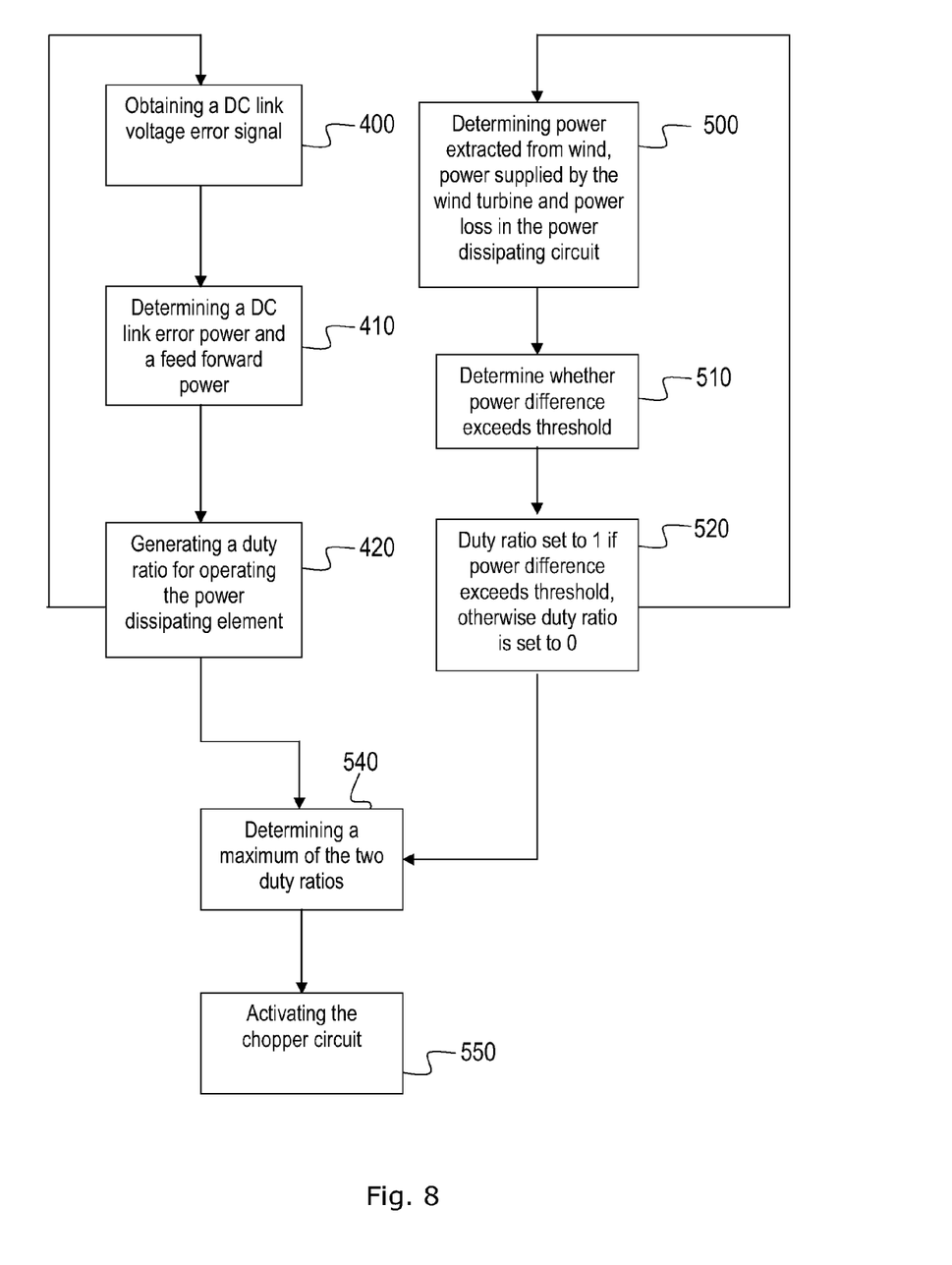
FIG. 8 shows a flow-chart of a method for operating the chopper circuit in the wind turbine according to a further embodiment.

FIG. 8 shows a flow-chart of a method for operating the power dissipating unit in the wind turbine according to a further embodiment. In this embodiment, the methods as defined in steps 400 to 420 and steps 500 to 520 are concurrently used for controlling the operation of the power dissipating unit. Steps 400 to 420 have already been described with reference to FIG. 6 and steps 500 to 520 have already been described with reference to FIG. 7. Steps 400 to 420 and steps 500 to 520 are repeated to constantly update the duty ratio.

Step 540 includes determining a maximum of the duty ratios from step 420 and step 520, and activating the power dissipating unit in step 550 based on the maximum of the two duty ratios. It should be noted that the power dissipating unit is only activated when the maximum of the duty ratios has a non-zero value.

It should be emphasized that the embodiments described above are possible examples of implementations which are merely set forth for a clear understanding of the principles of the invention. The person skilled in the art may make many variations and modifications to the embodiment(s) described above, said variations and modifications are intended to be included herein within the scope of the following claims.

The invention claimed is:

1. A variable speed wind turbine comprising:
   a generator;
   a power converter for converting at least a portion of electrical power generated by the generator, the power converter comprising a generator side converter, a grid side converter, and a DC (direct current) link therebetween;
   a power dissipating unit operatively coupled to the DC link; and
   a controller, wherein the controller is adapted to:
      determine a DC link voltage error signal, the DC link voltage error signal being the difference between a function of an actual DC link voltage and a function of a predefined reference DC link voltage;
      determine a DC link error power based on the DC link voltage error signal;
      determine a feed forward power; and
      generate a duty ratio for operating the power dissipating unit based on the DC link error power and the feed forward power.

2. The variable speed wind turbine of claim 1, wherein the power dissipating unit comprises at least a switch and one resistor.

3. The variable speed wind turbine of claim 1, wherein the DC link voltage error signal is the difference between the squares of the actual DC link voltage and the predefined reference DC link voltage.

4. The variable speed wind turbine of claim 1, wherein the controller further comprises a PI (Proportional-Integral) controller for determining the DC link error power based on the DC link voltage error signal.

5. The variable speed wind turbine of claim 1, wherein the controller is further adapted to determine the feed forward power based on the difference between a power supplied to the generator side converter and a power transferred by the grid side converter.

6. The variable speed wind turbine of claim 5, wherein the controller is further adapted to estimate the power supplied to the generator side converter based on the difference between power extracted from wind and power losses in the generator and in a drive train of the wind turbine.

7. The variable speed wind turbine of claim 1, wherein the controller is further adapted to generate the duty ratio by:
   determining a power to be dissipated by the power dissipating unit;
   determining a maximum power that can be dissipated by the power dissipating unit; and
   determining the ratio of the power to be dissipated and the maximum power, thereby obtaining the duty ratio.

8. The variable speed wind turbine of claim 1, wherein the controller is further adapted to:
   determine power extracted from the wind, power supplied by the wind turbine and power loss in the power dissipating unit;
   determine the difference between the power extracted from the wind and the sum of the power supplied by the wind turbine and the power loss in the power dissipating unit; and
   activate the power dissipating unit when the difference between the power exceeds a predefined power difference threshold.

9. A method for operating a power dissipating unit in a wind turbine, the wind turbine comprises a power converter for converting at least a portion of electrical power generated by a generator wherein the power converter comprises a generator side converter, a grid side converter,. and a DC (direct current) link therebetween, the power dissipating unit is operatively coupled to the DC link, the method comprising:

obtaining a DC link voltage error signal, the DC link voltage error signal being the difference between a function of an actual DC link voltage and a function of a predefined reference DC link voltage;

determining a DC link error power based on the voltage error signal;

determining a feed forward power; and generating a duty ratio for operating the power dissipating unit based on the DC link error power and the feed forward power.

10. The method of claim 9, wherein the DC link voltage error signal is determined from the difference between the squares of the actual DC link voltage and the predefined reference DC link voltage.

11. The method of claim 9, wherein the DC link error power is determined based on the DC link voltage error signal using a PI (Proportional-Integral) controller.

12. The method of claim 9, wherein the feed forward power is determined based on the difference between a power supplied to the generator side converter and a power transferred by the grid side converter.

13. The method of claim 12, wherein the power generated by the generator is estimated based on the difference between power extracted from wind and power losses in the generator and in a drive train of the wind turbine.

14. The method of claim 9, wherein generating the duty ratio comprises:

determining a power to be dissipated by the power dissipating unit;

determining a maximum power that can be dissipated by the power dissipating unit; and determining the ratio of the power to be dissipated and the maximum power, thereby obtaining the duty ratio.

15. The method of claim 9, further comprising:

determining power extracted from the wind, power supplied by the wind turbine and power loss in the power dissipating unit;

determining the difference between the power extracted from the wind and the sum of the power supplied by the wind turbine and the power loss in the power dissipating unit; and activating the power dissipating unit when the difference between the power exceeds a predefined power difference threshold.

* * * * *

UNITED STATES PATENT AND TRADEMARK OFFICE
CERTIFICATE OF CORRECTION

| | | |
|---|---|---|
| PATENT NO. | : 8,093,742 B2 | Page 1 of 1 |
| APPLICATION NO. | : 12/976292 | |
| DATED | : January 10, 2012 | |
| INVENTOR(S) | : Amit K. Gupta et al. | |

It is certified that error appears in the above-identified patent and that said Letters Patent is hereby corrected as shown below:

In the Specification:

At column 6, line number 56, change "are" to --is--.

At column 10, line number 63, change "is" to --are--.

At column 12, line number 13, change "starts" to --start--.

In the Claims:

At column 14, claim number 9, line number 67, change "converter,." to --converter,--.

Signed and Sealed this
Thirteenth Day of March, 2012

David J. Kappos
*Director of the United States Patent and Trademark Office*